Nov. 19, 1935.  G. V. CONDON  2,021,225
METHOD OF AND APPARATUS FOR MAKING SHOES
Filed April 3, 1934   2 Sheets-Sheet 1

INVENTOR
George V. Condon
By his Attorney
Harlow M. Davis

Nov. 19, 1935.     G. V. CONDON     2,021,225
METHOD OF AND APPARATUS FOR MAKING SHOES
Filed April 3, 1934     2 Sheets-Sheet 2

INVENTOR
George V. Condon
By his Attorney
Harlow M. Davis

Patented Nov. 19, 1935

2,021,225

UNITED STATES PATENT OFFICE 2,021,225

METHOD OF AND APPARATUS FOR MAKING SHOES

George V. Condon, Roslindale, Mass., assignor to United Shoe Machinery Corporation, Paterson, N. J., a corporation of New Jersey Application April 3, 1934, Serial No. 718,823

26 Claims. (Cl. 12—1)

This invention relates to methods of and apparatus for making shoes and is concerned chiefly with certain problems encountered incidentally to softening the upper materials of shoes to condition them for lasting. The invention is herein illustrated as having utility in the making of two types of shoes, but is not limited to shoes of those types.

To those experienced in the use of steam for softening parts of shoes (not dry steam, but hot water-vapor at atmospheric pressure) it is well known that moisture sufficient to soften upper-leather, and heat sufficient to soften thermoplastic stiffening members (toe-boxes and counter-stiffeners) are ruinous to sole-leather. Consequently, in the manufacture of certain types of stitchdown shoes which comprise extension outsoles prior to being lasted, it has heretofore been considered necessary to forego the use of steam for conditioning the upper-leather for lasting, and to complete the assembling of the uppers at the lasting station by inserting pre-heated thermoplastic stiffening members between the upper-leather and the linings. The use of thermoplastic toe-stiffeners is more general than that of counter-stiffeners made of thermoplastic material. Accordingly, the following description will proceed in terms that deal more particularly with the toe-ends of shoes than with the heel-ends.

From the foregoing it may be appreciated that lasting operators have heretofore been burdened with the duty of heating thermoplastic toe-boxes individually and inserting them into non-heated uppers, and that the vamps of the shoes have been deprived of softening treatment to condition them for lasting, both of which conditions, though objectionable, have been tolerated to save the outsoles of the partially assembled shoes from the damaging effects of steam.

Such being the circumstances constituting a typical problem toward which the present invention is directed, an object of the invention is to provide improvements in methods of conditioning pulled-over shoes for lasting, whereby the sole of a pulled-over shoe may be protected from the damaging effects of steam used to soften the upper and a thermoplastic stiffener included therein.

In accordance with this object one aspect of the invention provides an improvement in methods of conditioning shoes for end-lasting which consists in separating one end of the sole of a pulled-over shoe from the corresponding end of the upper, flowing hot moist vapor on that end of the upper, and at the same time maintaining the sole and the vapor segregated from each other. Thus, a thermoplastic stiffener previously incorporated into the upper may be softened by the heat of the vapor while the leather of the upper is being softened by the moisture thereof, and although the segregation of the vapor and the sole from each other may not provide complete thermal insulation of the sole it will at least protect the sole from moisture and from heat of a damaging degree. Consequently, such segregation renders it practicable to assemble both a thermoplastic stiffener and a sole with a shoe-upper before the latter requires the services of a lasting operator.

To render such procedure commercially practicable, the invention also provides a suitable sole-protecting device adapted to cooperate with an apparatus for conditioning the upper. Preferably, such a device should be an impervious barrier, but it need not be a non-conductor of heat, since, in any event, so long as it prevents direct contact of the vapor with the sole its protective effect will be sufficient for the purposes in view.

As herein illustrated, a shoe-conditioning apparatus constructed in accordance with the invention may comprise means arranged to support a pulled-over shoe in position for softening treatment, means arranged to supply hot moist vapor to one end of the upper of a shoe arranged on the supporting means, and a barrier formed and arranged to extend between that end of the upper and an unfastened end of a sole secured in assembled relation to the upper, the barrier being formed to prevent the vapor from moistening the sole.

Certain other novel aspects of the invention are illustrated in the drawings and hereinafter described and claimed.

Referring to the accompanying drawings.

Figure 8:
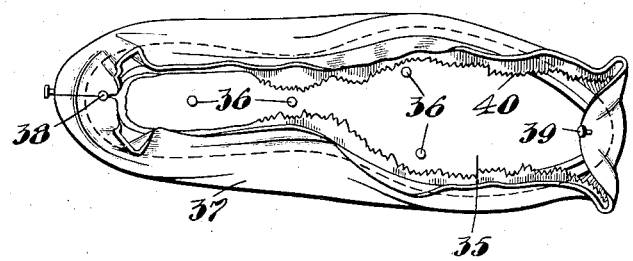
Fig. 8 is a bottom plan view of a typical welt-shoe that has been pulled over and side-lasted.
Figure 9:
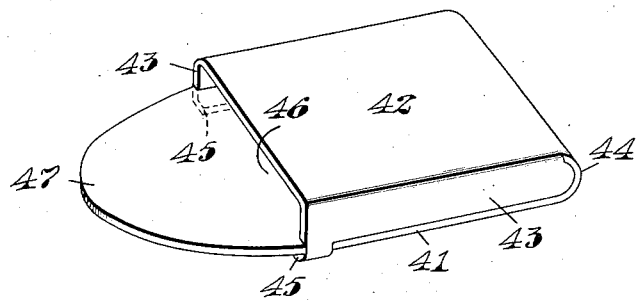
Figure 10:
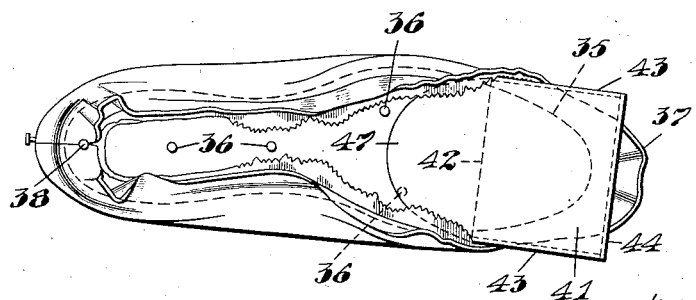

Fig. 9 is a perspective view of a sheet-metal envelop adapted to receive one end of a sole to protect the latter from steam while the corresponding end of the upper is being steamed; and Fig. 10 is a view similar to Fig. 8 and represents a protective envelop as having been applied to the toe-end of the insole and as spreading the margin of the upper so that steam may have access to the interior as well as the exterior of the toe-end of the upper.

Figure 1:
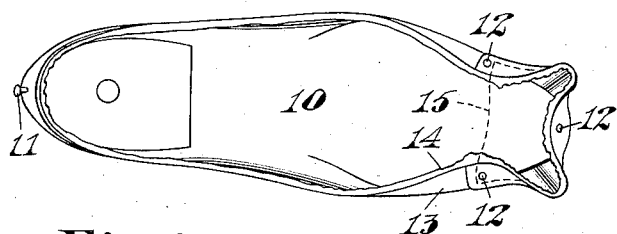
Fig. 1 is a bottom plan view of a last to which a pulled-over shoe-upper is secured with temporary tacks, this view representing the first stage of assembling a certain type of stitchdown shoe hereinafter more fully described.

Although the utility of the novel aspects of the present invention is not limited to making stitch-down shoes of the type herein illustrated, certain features of construction and certain steps practiced in the manufacture of such shoes are herein described to furnish an illustrative example of the benefits to be derived from the invention. Referring to Fig. 1 a lined shoe-upper is assembled on a last 10 and is secured thereto with a temporary tack 11 driven into the heel-end of the last and with three temporary tacks 12 driven into the bottom of the last, one at the toe-end and two at the sides adjacent to the tip-line. This operation may be performed by a pulling-over operator. A shoe of this type does not comprise an insole but may comprise one or two outsoles, both of a size to extend beyond the bottom outline of the last. If the shoe is to be provided with a toe-box to stiffen the toe-end of the upper, it will be inserted by the pulling-over operator between the vamp 13 and the lining 14 before the latter are pulled over and tacked as shown in Figure 1. Toe-boxes for this purpose are commonly made of felt impregnated with a thermoplastic compound that remains dry and resilient at atmospheric temperature but becomes soft and tacky when heated. A toe-box of this character is represented by dotted lines 15 in Fig. 1.

For reasons that will appear later, it has been the practice to omit the toe-boxes 15 at the pulling-over stage and to burden the lasting operators with the duties of heating them individually, folding back the vamps, inserting the toe-boxes, and rearranging the vamps. Now, however, when a toe-box of this character is to be used the pulling-over operator may heat it individually, insert it between the lining and the vamp, pull over the margin of the upper upon the bottom of the last, and drive the tacks 12 through the pulled-over margin as represented.

Figure 2:
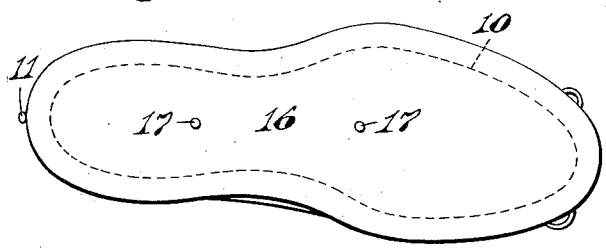
Fig. 2 is a similar view representing the second stage of assembling, an outsole having been placed on the bottom of the last and secured thereto with two temporary tacks driven into the shank portion of the last, the bottom outline of which is represented by a dotted line.

The pulling-over operator or a sole-laying operator next lays an extension outsole 16 on the bottom of the last and on the upwardly projecting margin of the upper and secures it to the last with temporary tacks 17 driven elsewhere than in the forepart, since it is desirable to leave the forepart of this sole temporarily unfastened, to the end that it may be later separated from the pulled-over margin of the vamp. As shown in Fig. 2, one tack 17 is driven through the sole and into the bottom of the last adjacent to the ball-line and another such tack is driven at a point adjacent to the junction of the shank and the heel-seat portion. Thus, although the sole is secured to the assemblage both ends thereof are capable of being flexed away from the last for any purpose that may require temporary separation. In Fig. 2 the bottom outline of the last is represented by a dotted line.

A shoe in the condition represented in Fig. 2 is ready to proceed to the lasting operator to whom it comes with all the necessary elements assembled so far as his duties are concerned. He may last the heel-end first or the toe-end first according to his individual preference or according to any related conditions that may govern the lasting procedure; but, however that may be, the thermoplastic toe-box 15 is presumably cold and stiff when the toe-lasing operator takes up a shoe to condition it for lasting. Presumably, also, the vamp is dry and therefore not so limp or pliable as it should be to facilitate the toe-lasting operation or to produce the most satisfactory results. Consequently, immediately prior to lasting the toe-end the lasting operator will soften the vamp with steam for a period of time, say one minute more or less, of sufficient duration to enable the heat of the steam to pass through the vamp and reduce the toe-box 15 once more to a limp and tacky condition, but since the quantity of moisture necessary to soften the vamp, and the degree of heat necessary to soften the toe-box would do irreparable damage to the outsole 16 the operator first interposes a baffle-plate 18 between the pulled-over end of the upper and the outsole, the purpose of the baffle-plate being to prevent damaging the outsole with the steam used to soften the upper. To fulfill its protective function such a baffle-plate need not have any physical connection with any other element or apparatus, but on the other hand it is desirable, for this type of shoe, to secure it to some convenient supporting element in cooperative relation to an apparatus for conditioning the upper of a shoe with steam, to the end that it will always be in the desired location for use without being handled. Moreover, the baffle-plate is preferably made of impervious material such as galvanized iron, adapted to preserve a definite shape and folded back with a bend 19 to form an envelop having a flaring mouth. The sides of the envelop are closed by inwardly bent tabs 20 to exclude steam from the sole-receiving chamber thus formed.

Figure 3:
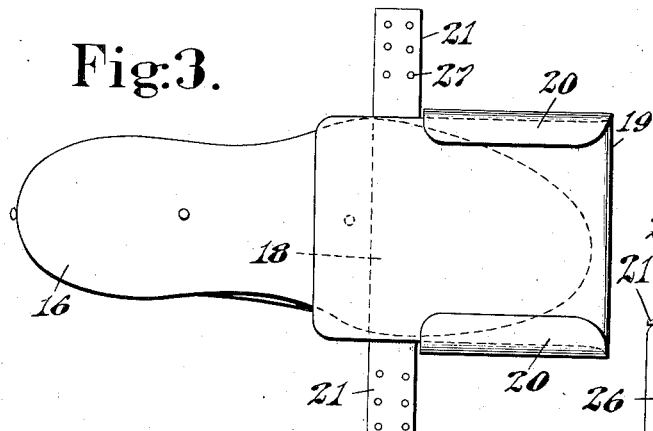
Fig. 3 is a view similar to Fig. 2 but includes an impervious envelope encasing the forepart of the outsole to guard it against the effects of heat and moisture while the vamp is being softened with steam.

As shown in Fig. 3, the lower plate of the envelop is provided with ears 21 extending laterally in opposite directions and adapted to be seated upon and secured to the upper edge of a shoe-supporting board 22 of the type illustrated in U. S. Letters Patent No. 1,341,183, granted May 25, 1920 on an application in the name of B. S. Lee. Such a board is attached to or constitutes the front wall of a casing 23 that forms a steam-chamber 24 into which the forepart of an assembled or pulled-over shoe may be inserted for softening treatment. A steaming apparatus of this type may have provision for any desired number of shoes but that herein illustrated has a capacity for two shoes, the upper margin of the board 22 being provided with two substantially semi-circular recesses 25 each adapted to receive the forepart of an inverted pulled-over shoe while the heel-part remains outside the casing where it may be supported by any suitable means, such as a bent rod or wire 26. The mouth portions of two such envelops are arranged to bridge the recesses 25 and their closed portions extend into the steaming chamber 24. The ears 21 of the envelops are provided with perforations 27 through which brads or tacks may be driven to secure the envelops to the board 22.

Figure 4:
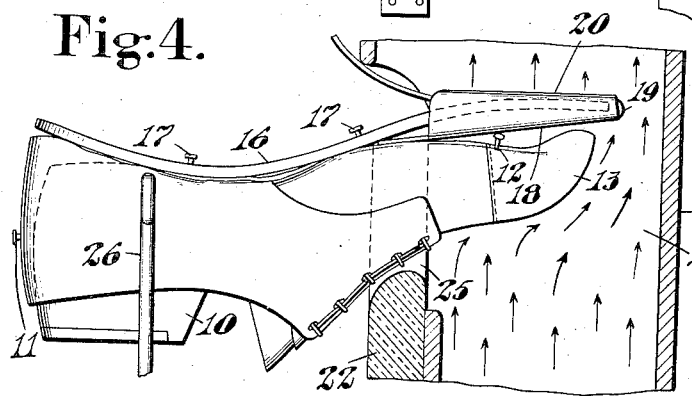
Fig. 4 represents the assembled shoe in side elevation and in cooperative relation to a steaming apparatus by which the vamp may be softened to render it sufficiently pliable for lasting.

With this construction, the act of inserting the forepart of an inverted shoe through a recess 25 and into the steaming chamber 24 is sufficient also to interpose a baffle-plate between the pulled-over vamp 13 and the outsole 16, since the forepart of the outsole may thereby be inserted into the corresponding protective envelop as illustrated in Fig. 4. Steam rising in the chamber 24 toward the outlet stack 26 will flow in contact with the vamp of a shoe but will not come into contact with an outsole overlying a baffle-plate. The protection afforded to the outsole by the baffle-plate solves the problem that has heretofore retarded production, precluded steaming the upper, and burdened the lasting operator with the duty of heating a toe-box individually and inserting it into an unsteamed shoe-upper.

The present invention is not concerned with the manner in which steam is supplied to the chamber 24 nor to the type of means for supplying it. If desired, the steam may be generated in the chamber 24 by electrical heating means of the type disclosed in said Letters Patent No. 1,341,183 or, if preferred, it may be generated at a remote source of supply and conducted through pipes into the chamber 24 in accordance with the disclosure in U. S. Letters Patent No. 1,094,548, granted April 28, 1914 on an application in the name of E. L. Keyes.

Whatever the type of steaming apparatus consistent with the requirements hereinbefore set forth, such apparatus will preferably be stationed adjacent to a suitable lasting apparatus, to the end that a lasting operator may transfer a suitably conditioned shoe from the steaming apparatus to the lasting apparatus and proceed with the lasting operation while the vamp is softened with moisture and the toe-box 15 is softened with heat. For example, the lasting apparatus may be of the type illustrated and described in U. S. Letters Patent No. 1,861,832, granted June 7, 1932 on an application in the name of W. C. Baxter, such an apparatus being specially designed to operate on stitchdown shoes. For the purpose of setting forth novel aspects of the improved method to which the present invention is directed, a brief explanation of certain steps in the operation of the apparatus last referred to and brief reference to certain elements thereof will suffice.

Figure 6:
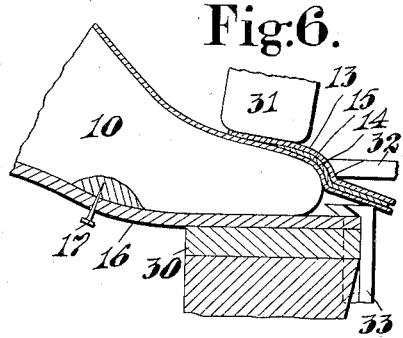
Fig. 6 is a sectional view including the forepart of the shoe in cooperative relation to certain elements of a well-known lasting machine designed to operate on stitch-down shoes.
Figure 7:
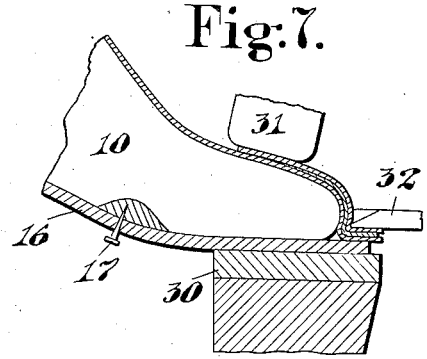
Fig. 7 is a view similar to Fig. 5 but represents a subsequent stage of the toe-lasting operation.

As illustrated in Figs. 6 and 7, the lasting apparatus comprises a supporting platform 30 on which the forepart of a conditioned shoe may be placed when the lasting of the toe-end is about to be commenced. A spring-pressed clamping pad 31 covered with suitable soft material that will not scar the upper is arranged to bear downwardly on the toe-portion of the vamp in the vicinity of the tip-line. This clamping pad and the platform 30 cooperate to clamp the vamp and the extension outsole 16 against the last with enough pressure to maintain them against accidental displacement by the tension and other stresses to which the vamp is to be subjected. Before the toe-end of the shoe is inserted between the platform 30 and the clamping pad 31 the lasting operator pulls out the temporary tacks 12 and turns out the margin of the vamp which was initially turned in by the pulling-over operator to receive the tacks. The margin of the vamp now being turned out, the lasting operator inserts the toe of the shoe between the platform 30 and the clamping pad 31 and at the same time guides the outturned margin of the vamp under a set of horizontal toe-lasting wiper-plates, one of which is indicated at 32. The lasting apparatus being described also includes a plurality of vertically movable clamping members 33 that cooperate with the wipers 32 to clamp the outturned margin of the vamp. After the parts have been placed in the positions shown in Fig. 6 the clamping members 33 rise, thereby clamping the margin of the vamp against the wipers, their pressure against the vamp being sufficient to insure the desired degree of tension to which the upper must be subjected to conform it to the last. While the margin of the upper is thus clamped the platform 30 rises, thereby elevating the shoe and the clamping pad 31, the upper being thereby tensioned against the toe of the last but slipping meanwhile between the wipers 32 and the clamping members 33. As the platform 30 approaches the wipers 32 the clamping members 33 are gradually retracted horizontally, to the end that the outturned margin of the vamp may eventually be seated upon the marginal extension of the outsole 16, as shown in Fig. 7, and thereby clamped against the wipers 32.

It is to be understood that the thickness of the lining, of the toe-box, and of the vamp as pictured in Figs. 6 and 7 is exaggerated, but this is only because it is not practicable to adhere strictly to true proportions of those factors in a drawing of this scale and at the same time to give those elements sufficient individuality to render them distinct. If drawn in true proportion, the aggregate thickness of these elements would not be more than one-half the aggregate thickness represented in these figures.

The upward pressure of the platform 30 against the wipers 32 is sufficient to compress the outturned margin of the upper and to disperse the tacky substance with which the toe-box is impregnated so that some of it will adhere to the marginal extension of the outsole. Before the platform 30 quite reaches its highest level the wipers are moved inwardly sufficiently to tuck the upper snugly into the angle formed by the last and the marginal extension of the sole, the effect of which is to form a more sharply defined crease in the upper than that shown. The parts remain under pressure for a sufficient length of time to enable the tensioned upper to become set and bonded to the sole by adhesion of the thermoplastic toe-box which soon becomes cold and stiff. When the shoe is subsequently removed from the lasting apparatus the toe-portion of the upper will remain conformed to the last and to the marginal extension of the sole.

Certain aspects of the invention may also be utilized to protect the insoles of other types of shoes from the damaging effect of steam. For example, welt-shoes and McKay shoes may be conditioned for lasting in the manner hereinafter described. Fig. 8 represents a typical welt-shoe that has been pulled over and side-lasted, while Fig. 10 represents such a shoe provided with a sheet-metal envelop of a type particularly suitable for protecting the insole thereof. An envelop of this type is shown separately in Fig. 9.

Referring to Fig. 8, the insole 35 is attached to the bottom of a last with four temporary tacks 36 of which two are located approximately at the ball-line, one in the shank and one at the heel-seat. The pulled-over margin of the upper 37 at the heel-end of the shoe is secured to the insole by a temporary tack 38, while the corresponding portion at the toe end is secured by a temporary tack 39. This shoe has been side-lasted with staples according to a procedure that is now common for shoes of this type, but the lines of staples extend only slightly ahead of the ball-line. The dotted line in this figure represents the outline of the insole. The upper of this shoe includes a thermoplastic toe-box concealed from view but interposed between the vamp and a lining 40 of thin cotton-cloth.

Figure 5:
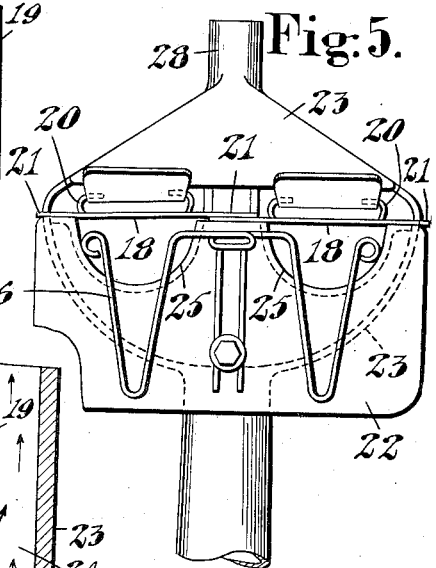
Fig. 5 is a front elevation of a steaming apparatus of the type represented in Fig. 4.

Figure 8 represents the condition in which such a shoe is brought to a lasting operator who will first condition the forepart of the upper for lasting by inserting it into a suitable steaming apparatus which may be of the type illustrated in Figs. 4 and 5, except that the protective envelops shown as attached to the board 22 in those figures may be omitted. Since the insole of a pulled-over shoe lies normally between the last and the pulled-over margin of the upper, a protective envelop of the type represented in Figs. 9 and 10 is more suitable than the type shown in Figs. 3, 4 and 5. The envelop illustrated in Figs. 9 and 10 is made of a single piece of sheet-metal suitably stamped and formed to provide confronting top and bottom walls 41 and 42, side walls 43, an end wall 44, and tabs 45 projecting from the walls 43 and adapted to be bent toward each other to hold the wall 41 against the edges of the walls 43. Preferably, the wall 41 projects a considerable distance beyond the mouth 46, defined by the edge of the wall 42, and thereby provides a tongue 47 adapted to overlie and protect the forepart of an insole nearly to the ball-line thereof when the envelop is applied to a shoe as pictured in Fig. 10. It is to be noted that Fig. 9 represents the envelop as inverted relatively to the arrangement in Fig. 10, the better to illustrate how the mouth 46 is formed. It is also to be understood that the sheet-metal of which such an envelop is made need not be as think as that illustrated, and that the exaggerated thickness represented in the drawings is merely for the sake of maintaining suitable spaces between the lines that represent thickness.

A lasting operator will be provided with a suitable supply of envelops such as that represented in Fig. 9, although they may be of different widths. When a lasting operator is about to steam the toe-end of a shoe he will first remove the temporary tack 39 at the toe-end, thus releasing the pulled-over margin of the upper at that end and also releasing the toe-end of the insole so that the latter may be separated from the last far enough to permit the wall 42 of a protective envelop to be inserted between it and the last. The envelop may therefore be applied to a shoe as shown in Fig. 10 by inserting the toe-end of the insole into it and arranging the wall 41 of the envelop to overlie the forepart of the insole. Thus, the envelop will not only segregate the toe-end of the insole from the steam, but will also spread the toe-end of the upper and separate the margin thereof from the last so that the steam may have virtually unobstructed access to the interior of this margin and to a thermoplastic toe-stiffener between the vamp and the lining. Since the toe-end of the insole is inside the envelop it will be protected against moisture and against the damaging effects of heat.

When the toe-end of an assemblage such as that shown in Fig. 10 has been in a steaming chamber for a sufficient length of time to condition the toe-stiffener and the vamp for lasting, the operator will remove it therefrom, detach the protective envelop and proceed in any usual or preferred manner to last the toe-end and the heel-end of the shoe. As hereinbefore stated, the use of thermoplastic material for counter-stiffeners is not so common as for toe-stiffeners, but if such material is used to stiffen the counters of shoes, protective envelops of the type represented in Figs. 9 and 10 may be used to guard the heel-seat portions of insoles against the damaging effects of moisture and heat. The use of an envelop for this purpose may necessitate removal of the tack 38 from the heel-end of the shoe to release the pulled-over margin of the upper and the heel-seat portion of the insole so that the wall 42 of an envelop may be inserted between the last and the insole.

Having thus described my invention, what I claim as new and desire to secure by Letters Patent of the United States is:

1. That improvement in methods of conditioning shoes for lasting which consists in separating one end of the sole of a pulled-over shoe from the corresponding end of the upper, flowing hot moist vapor on that end of the upper, and at the same time maintaining the sole and the vapor segregated from each other.

2. That improvement in methods of making shoes which consists in bending the toe-end of a sole slightly away from a last to which the sole and a pulled-over upper are attached, enveloping the toe-end of the sole individually, flowing hot moist vapor on the vamp until it is conditioned thereby for lasting, disenveloping the toe-end of the sole, and conforming the conditioned vamp to the last.

3. That improvement in methods of making shoes which consists in securing an upper and a sole to a last, enveloping one end of the sole individually, flowing hot moist vapor on the corresponding end of the upper adjacent to the enveloped end of the sole, disenveloping said end of the sole, and conforming said end of the upper to the last.

4. That improvement in methods of conditioning shoes for end-lasting, which consists in flowing moist vapor on a pulled-over end of the upper of a shoe with which an outsole is assembled, and at the same time maintaining the outsole and the vapor segregated from each other.

5. That improvement in methods of conditioning shoes for end-lasting, which consists in simultaneously heating and moistening a pulled-over end of the upper of a shoe with which an outsole is assembled, and at the same time maintaining the corresponding end of the outsole segregated from the moistening agent but in confronting relation to the pulled-over materials at that end of the shoe.

6. That improvement in methods of conditioning shoes for end-lasting which consists in interposing a barrier between one end of the upper of a pulled-over shoe and a partially secured outsole assembled therewith, softening said end of the upper with steam without steaming the outsole, and thereafter separating the shoe and the barrier.

7. That improvement in methods of making shoes which consists in interposing a thermoplastic stiffener between the upper-leather and the lining at one end of a shoe-upper, pulling over that end of the upper and securing it to the bottom of a last, securing an outsole in cooperative relation to the assemblage, interposing a barrier between that end of the upper and the outsole, softening said end of the upper and the interposed stiffener with steam without steaming the outsole, and thereafter separating the shoe and the barrier.

8. That improvement in methods of making shoes which consists in assembling a last, a lined upper and a toe-stiffener, pulling over the margin of the vamp and securing it to the bottom of the last, securing an outsole to the last, interposing a barrier between the vamp and the outsole, steaming the vamp without steaming the outsole, separating said barrier and the shoe, releasing said margin of the vamp from the last, and conforming the vamp to the last and the outsole.

9. That improvement in methods of making shoes which consists in assembling a last and a shoe-upper, pulling over the margin of the upper and securing it on the bottom of the last, securing an extension sole to the last, interposing a barrier between the upper and the outsole, softening the upper with moist vapor without moistening the outsole, separating the shoe and the barrier, releasing the pulled-over margin of the upper, turning out said margin, and conforming the moistened upper to the last and the marginal extension of said outsole.

10. That improvement in methods of making shoes which consists in assembling a last, a lined upper and a thermoplastic toe-stiffener, pulling over the margin of the vamp and securing it to the bottom of the last, securing an outsole to the last, interposing a barrier between the vamp and the outsole, softening the vamp and the toe-stiffener with hot moist vapor without moistening or objectionably heating the outsole, separating the shoe and the barrier, releasing the margin of the vamp, and conforming the vamp to the last and the outsole.

11. That improvement in methods of making shoes which consists in assembling a last, a lined upper and a thermoplastic toe-stiffener, pulling over the margin of the vamp and securing it to the bottom of the last, securing an extension sole to the last, enveloping the forepart of said sole individually, subjecting the vamp to hot moist vapor without moistening said sole, disenveloping the forepart of the sole, releasing the margin of the vamp from the last, turning out said margin, and conforming the moistened vamp to the last and the marginal extension of said sole.

12. A shoe-softening apparatus comprising means constructed and arranged to support a shoe, means arranged to supply hot moist vapor to a pulled-over end of the upper of a shoe arranged on said supporting means, and a barrier formed and arranged to extend between said end of the upper and an unfastened end of an outsole secured in assembled relation to the upper, said barrier being formed to prevent the vapor from moistening the outsole.

13. A shoe-softening apparatus comprising means constructed and arranged to support an inverted shoe on a last, means arranged to supply hot moist vapor to an end of the upper of a pulled-over shoe arranged on said supporting means, and a barrier formed and arranged to extend over said end of the upper and underlie an unfastened end of a sole secured in assembled relation to the upper, said barrier being constructed to prevent the vapor from moistening the sole.

14. A shoe-softening apparatus comprising means constructed and arranged to support a shoe on a last in an inverted position, means arranged to supply hot moist vapor to an end of the upper of a pulled-over shoe arranged on said supporting means, and a baffle-member adapted to extend between said end of the upper and the corresponding end of a sole attached to the last in assembled relation to the upper, said baffle-member being of a size to prevent the vapor from moistening the sole.

15. A shoe-softening apparatus comprising means constructed and arranged to support a shoe on a last, means arranged to supply hot moist vapor to an end of the upper of a pulled-over shoe arranged on said supporting means, and an envelop secured to an element of the apparatus in cooperative relation to said shoe-supporting means and arranged to enclose the corresponding end of a sole attached to the last in assembled relation to the upper without enclosing said end of the upper.

16. A shoe-softening apparatus comprising means constructed and arranged to support an inverted shoe on a last, means arranged to supply hot moist vapor to an end of the upper of a pulled-over shoe arranged on said supporting means, and a shape-preserving envelop secured to an element of the apparatus and thereby maintained in a position to enclose the corresponding end of a sole attached in assembled relation to the upper without enclosing said end of the upper.

17. A shoe-softening apparatus comprising means constructed and arranged to support an inverted shoe on a last, means arranged to supply hot moist vapor to the toe-end of the upper of a pulled-over shoe arranged on said supporting means, and a substantially horizontal baffle plate arranged to project between the last and the toe-end of a sole attached to the last in assembled relation to the upper, said plate being secured to an element of the apparatus and thereby maintained in its position of use.

18. A shoe-softening apparatus comprising a steaming chamber having an opening to receive the toe-end of an inverted pulled-over shoe, and an envelop arranged above said opening and having a mouth to receive individually and at the same time an unfastened end of a sole attached to the last in assembled relation to the upper of the shoe.

19. A shoe-softening apparatus comprising a steaming chamber having an opening to receive the toe-end of a pulled-over shoe, and a sheet-metal envelop secured thereto and having a mouth arranged to receive individually and at the same time an unfastened end of a sole attached to the last in assembled relation to the upper of the shoe.

20. A shoe-softening apparatus comprising a steaming chamber having an opening to receive the toe-end of a pulled-over shoe inserted bottom-up for treatment, and a baffle-member arranged to overlie the inserted portion of the upper and to underlie an unfastened end of a sole assembled therewith, said baffle-member being constructed and arranged to segregate said end of the sole from the steam flowing on the adjacent portion of the upper.

21. A shoe-softening apparatus comprising a steaming chamber one upright wall of which is provided with an opening to receive the toe-end of a pulled-over shoe inserted bottom up for treatment, and an envelop extending into said chamber from the upper part of said opening, said envelop being formed and arranged to overlie the inserted portion of the upper and having a mouth to receive individually an unfastened end of a sole forming a part of the shoe.

22. A sole-protector for shoe-treating apparatus comprising an impervious envelop having a shape-preserving mouth too small to receive an end of a shoe but of a shape and size to receive an unfastened end of a sole forming a part of a pulled-over shoe.

23. A sole-protector comprising a stiff impervious envelop having a mouth too small to receive an end of a shoe but of a shape and size to receive an unfastened end of a sole forming a part of a pulled-over shoe, the envelop being provided with one or more ears by which it may be secured to an apparatus for steaming shoe-uppers.

24. That improvement in methods of making shoes which consists in enveloping individually the toe-end of an insole of which other portions are secured to a pulled-over upper on a last, flowing hot moist vapor on the vamp until it is thereby conditioned for lasting, disenveloping the toe-end of the insole, and lasting the toe-end of the upper by drawing its margin over the margin of the insole.

25. That improvement in methods of conditioning shoes for lasting which consists in separating the toe-end of an insole from the toe-end of the upper of a pulled-over shoe on a last, flowing hot moist vapor on the toe-end of the upper, and at the same time maintaining the toe-end of the insole and the vapor segregated from each other.

26. That improvement in methods of making shoes which consists in spreading the toe-end of the upper of a pulled-over shoe of which an insole is secured to the upper elsewhere than at the toe-end, enveloping the toe-end of the insole individually, flowing hot moist vapor simultaneously on the interior and the exterior of the spread toe-end of the upper, disenveloping the toe-end of the insole, and lasting the toe-end of the upper over the insole.

GEORGE V. CONDON.